(12) United States Patent
Saliba

(10) Patent No.: US 7,392,218 B2
(45) Date of Patent: Jun. 24, 2008

(54) METHOD AND APPARATUS FOR STOCK AND INDEX OPTION PRICE IMPROVEMENT, PARTICIPATION, AND INTERNALIZATION

(75) Inventor: Anthony J. Saliba, Chicago, IL (US)

(73) Assignee: LiquidPoint, L.L.C., Chicago, IL (US)

( * ) Notice: Subject to any disclaimer, the term of this patent is extended or adjusted under 35 U.S.C. 154(b) by 926 days.

(21) Appl. No.: 10/786,196

(22) Filed: Feb. 25, 2004

(65) Prior Publication Data

US 2004/0199455 A1 Oct. 7, 2004

Related U.S. Application Data

(63) Continuation of application No. 09/621,769, filed on Jul. 21, 2000, now Pat. No. 6,829,589.

(51) Int. Cl.
G06Q 40/00 (2006.01)

(52) U.S. Cl. .............................. 705/37; 705/35; 705/36

(58) Field of Classification Search .................. 705/35, 705/36, 37
See application file for complete search history.

(56) References Cited

U.S. PATENT DOCUMENTS

| | | |
|---|---|---|
| 4,674,044 A | 6/1987 | Kalmus et al. |
| 5,038,284 A | 8/1991 | Kramer |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,297,031 A | 3/1994 | Gutterman et al. |
| 5,297,032 A | 3/1994 | Trojan et al. |
| 5,305,200 A | 4/1994 | Hartheimer et al. |
| 5,375,055 A | 12/1994 | Togher et al. |
| 5,689,652 A | 11/1997 | Lupien et al. |
| 5,724,524 A | 3/1998 | Hunt et al. |
| 5,727,165 A | 3/1998 | Ordish et al. |
| 5,758,328 A | 5/1998 | Giovannoli |
| 5,774,877 A | 6/1998 | Patterson et al. |
| 5,793,301 A | 8/1998 | Patterson et al. |
| 5,809,483 A | 9/1998 | Broka et al. |
| 5,884,286 A | 3/1999 | Daughtery, III |
| 5,915,245 A | 6/1999 | Patterson, Jr. et al. |
| 5,950,176 A | 9/1999 | Keiser et al. |
| 6,016,483 A | 1/2000 | Rickard et al. |

(Continued)

OTHER PUBLICATIONS

Investment Dealers' Digest "Schawb inks deal with Cincinnato to trade NYSE stocks" Sep. 6, 1999.*

(Continued)

*Primary Examiner*—Jagdish N Patel
(74) *Attorney, Agent, or Firm*—McAndrews Held & Malloy, Ltd.

(57) ABSTRACT

A method for stock option trading includes receiving an option order at a market, contemporaneously receiving a copy of the option order at an electronic drop (EDrop) system, which is separate and distinct from the market, obtaining a potential cross quantity and a potential cross price based on the option order at the EDrop system, and submitting, through the EDrop system, a contra-order, with respect to the option order, to the market for fulfillment, wherein the contra-order specifies at least one of an underlying security potential cross quantity, and the potential cross price.

48 Claims, 3 Drawing Sheets

U.S. PATENT DOCUMENTS

| | | |
|---|---|---|
| 6,321,212 B1 | 11/2001 | Lange |
| 6,493,682 B1 | 12/2002 | Horrigan et al. |
| 6,539,362 B1 | 3/2003 | Patterson, Jr. et al. |
| 6,618,707 B1 | 9/2003 | Gary |
| 6,766,304 B2 | 7/2004 | Kemp, II et al. |
| 6,772,132 B1 | 8/2004 | Kemp, II et al. |
| 6,938,011 B1 | 8/2005 | Kemp, II et al. |
| 6,993,504 B1 | 1/2006 | Friesen |
| 7,212,999 B2 | 5/2007 | Friesen |
| 2002/0138299 A1* | 9/2002 | Nations ........................ 705/1 |
| 2002/0194115 A1* | 12/2002 | Nordlicht et al. .............. 705/37 |
| 2003/0023542 A1 | 1/2003 | Kemp, II et al. |

OTHER PUBLICATIONS

Walker, Joseph A., "How the Options Markets Work," 1991, Chapter 6, Equity Options Strategies.

* cited by examiner

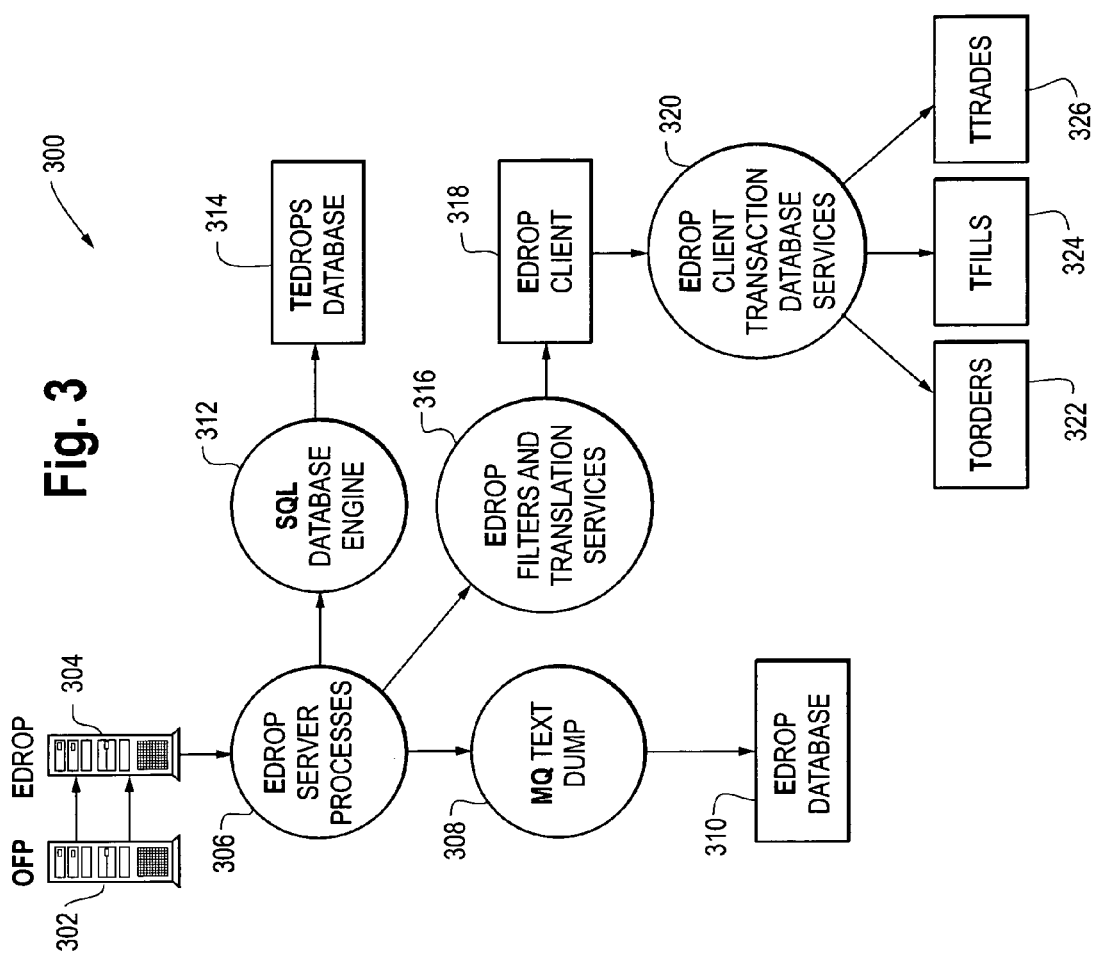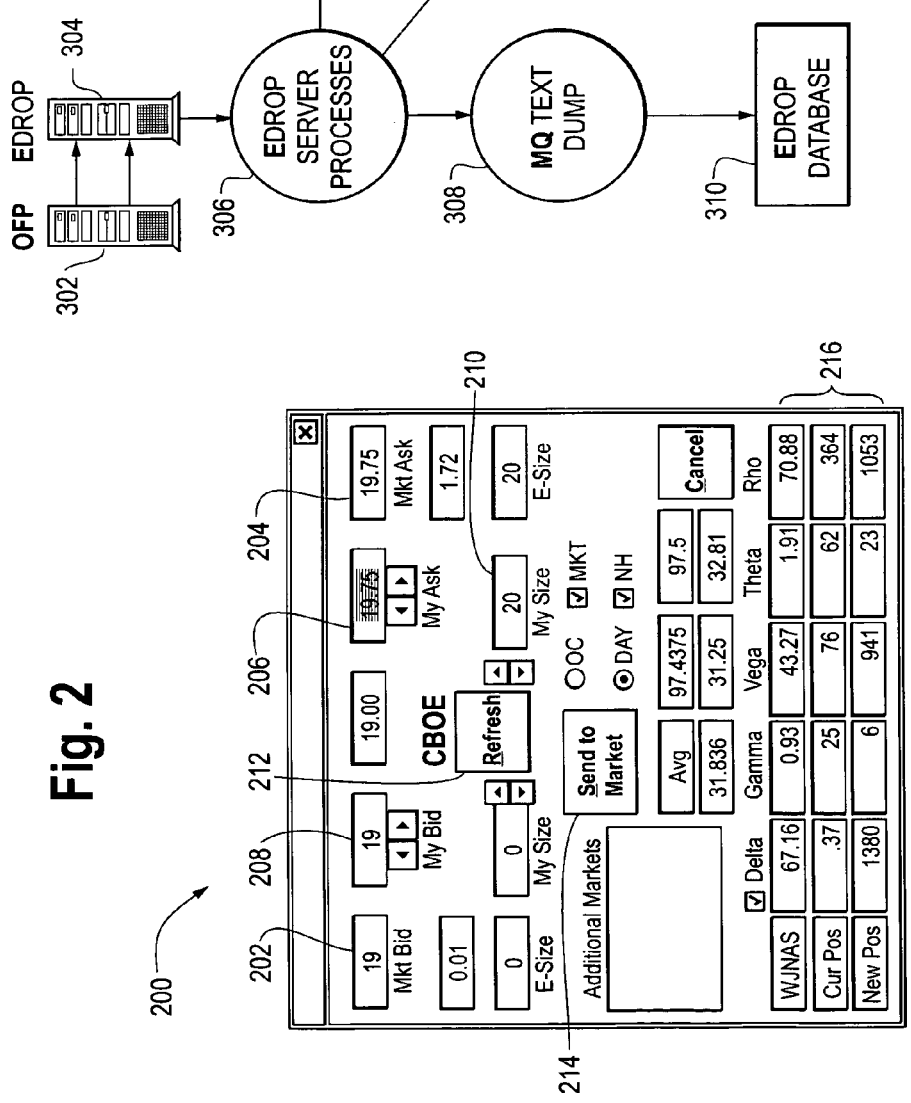

METHOD AND APPARATUS FOR STOCK AND INDEX OPTION PRICE IMPROVEMENT, PARTICIPATION, AND INTERNALIZATION

This application is a continuation of pending application Ser. No. 09/621,769, entitled "Method and Apparatus for Stock and Index Option Price Improvement, Participation and Internalization," filed on Jul. 21, 2000, now U.S. Pat. No. 6,829,589 which is hereby expressly incorporated by reference in its entirety, including the specification, claims, drawings, and abstract.

BACKGROUND OF THE INVENTION

The present invention relates to securities trading. In particular, the present invention relates to a method for trading stock options that provides an intermediary with copies of option orders destined for a market.

An option (either stock or index) provides a contractual agreement that allows the holder to buy or sell a security or its underlying cash equivalent at a designated price for a specified period of time, unaffected by movements in the security market price during that period. Put and call options, purchased both for speculative and hedging reasons, are typically made in anticipation of changes in underlying prices. A put option provides the holder an option to sell, or put, shares to the other option party at a fixed put price even though the market price for the security declines. On the other hand, a call, provides the holder an option to buy, or call for, shares at a fixed call price notwithstanding a rise in the market price for the security.

In the past, order flow providers (OFPs) generated option orders to buy or sell put and call options. In particular, the OFP accepted a customer order (e.g., a buy put order), encoded the order, and transmitted the order directly to a market. The market (e.g., the Chicago Board of Options Exchange or CBOE), received the order and presented it to raders that determined whether to fill the order in part, in full, or not at all (i.e., an out) in a process often referred to as matching. The result of the matching process is then communicated back to the OFP that subsequently alerts the customer.

The order flow processing described above, however, only provides an effective mechanism for the market itself to trade options. In other words, past order flow processing was a closed system. As a result, other individuals and organizations that could also meaningfully participate in option trading and possibly improve the customer price were excluded from the opportunity to do so.

A need has long existed in the industry for a method for trading options that addresses the problems noted above and others previously experienced.

BRIEF SUMMARY OF THE INVENTION

A preferred embodiment of the present invention provides a method for stock and index option trading. The method includes the steps of receiving an option order, a copy of an option order, or option order information sufficient to ascertain the type of order and an associated contract (collectively referred to below as an "option order copy"), from an order flow provider. The option order is contemporaneously submitted to a market. The option order copy identifies, as examples, puts, calls, contract elements including a contract identifier, an underlying security, strike price, expiry, and option quantity. The method then determines a potential cross quantity and potential cross price based on the option order and submits to a market a contra-order (with respect to the originally received option order) specifying the contract (including the underlying security and expiry), as well as a potential cross quantity, and a potential cross price.

The option orders may be any of buy calls, sell calls, buy puts, and sell puts, as examples. Thus, when the option order is a buy call, the contra-order will be a sell call, when the option order is a sell call, the contra-order will be a buy call. Similarly, when the option order is a buy put, the contra-order will be a sell put, when the option order is a sell put, the contra-order will be a buy put.

The method may also, for example, translate the option order from any number of order flow provider formats into a common internal trading system format. Similarly, the contra-order may be formatted for any predetermined destination market, including the CBOE, PCOAST, AMEX, PHLX, or ISE.

In certain embodiments, the method may automatically determine the potential cross quantity and potential cross price and submit the contra-order without human intervention. In other embodiments, the method may popup a display that shows the contract elements, option bid price or option ask price, market bid and ask prices for the underlying security, risk management information, and the like, at a trader terminal, and monitor the trader terminal for a submit indicator (e.g., a click on a Submit button). In addition, the method may filter option orders before automatically submitting the contra-order, or before presenting option order related information on the trader terminal.

BRIEF DESCRIPTION OF SEVERAL VIEWS OF THE DRAWINGS

FIG. 2 shows an exemplary option pop-up window.
FIG. 3 illustrates a data flow diagram for an EDrop server.

DETAILED DESCRIPTION OF THE INVENTION

Figure 1:
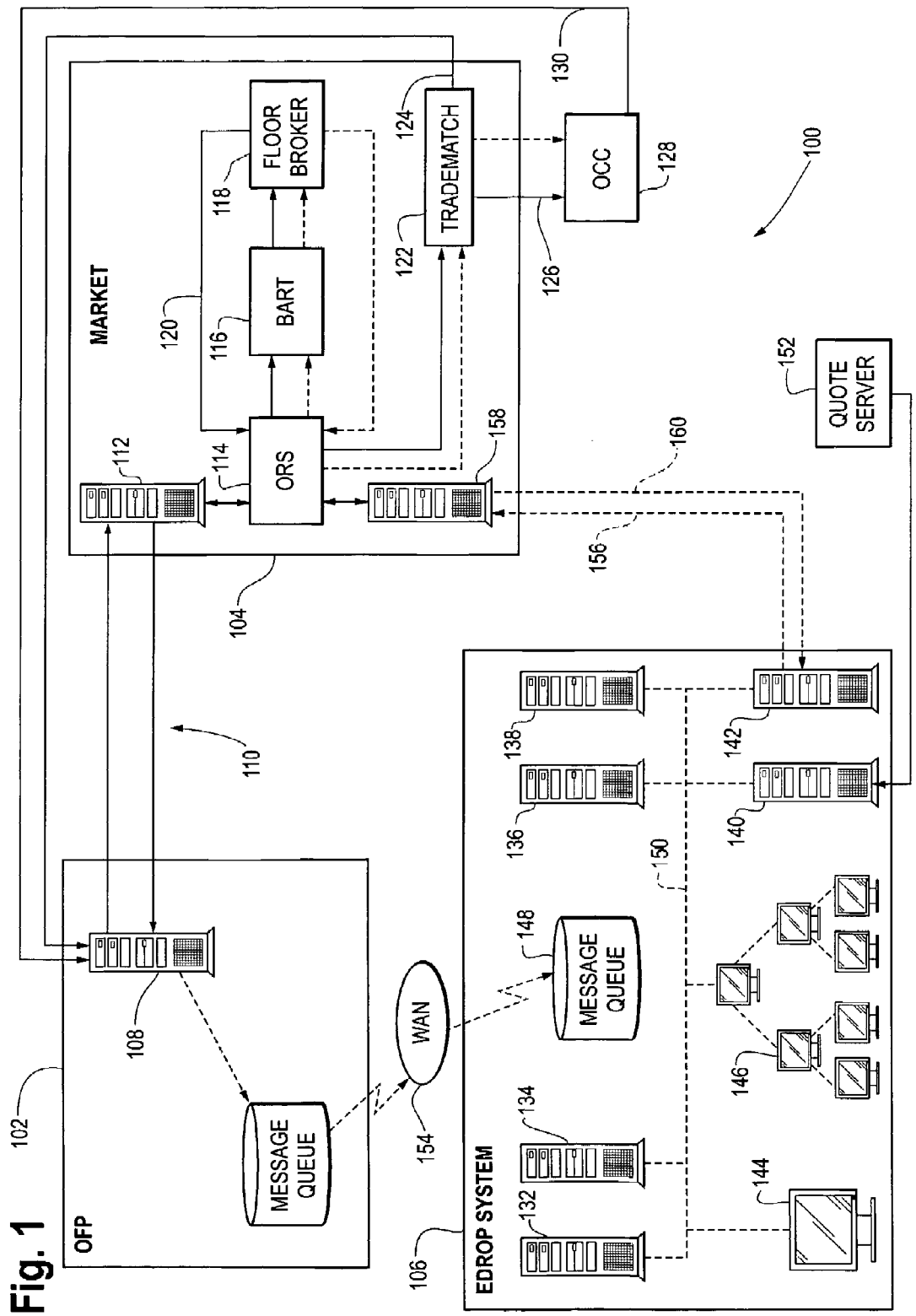
FIG. 1 illustrates an option trading network.

Turning now to FIG. 1, that figure presents a high level diagram of an options trading network 100. In FIG. 1, solid arrows represent conventional order flow processing, while dotted arrows show extended order flow processing as described in more detail below. The network 100 includes an order flow provider (OFP) 102, a market 104, and an electronic drop (EDrop) system 106. At the OFP 102, a mainframe 108 generates option orders that are transmitted over a network 110 to a server 112 at the market. The particular market structure discussed below is that of the Chicago Board of Options Exchange (CBOE), but it is noted that the present trading method may cooperate with any option market.

The server 112 provides the option orders to an order routing system 114 that forwards option orders to the BART 116. The BART (Booth Automated Routing Terminal) 116 is an exchange provided system that allows the OFP's staff to intercept an order for routing purposes. Orders routed through BART are eligible for packet restructuring. This allows for firm responsible for the BART terminal to specify which information is passed onto the PARS Terminal. The PARS terminal is the destination of all BART orders and is held by a broker in the trading pit. Once an order is routed to PARS from BART the order will then be executed. A BART terminal can handle limitless numbers of PARS stations giving the firm the ability to route its orders very definitively. One or more floor brokers 118 decide whether to fill, partially fill, or take no action on an option order. Resultant order acknowledgements are communicated back to the order routing system 114 over the link 120. The order acknowledgements pass through the trade-match module 122 where initial clearing functions begin. A report of unmatched trades (i.e., outs) are communicated back to the OFP 102 via the link 124, while matched (i.e., partial or complete fills) are communicated over link 126 to the OCC 128. The OCC (Options Clearing Corporation) 128 processes the pre-matched trades for final clearing and settlement, and communicates a report of matched trades back to the OFP 102 through the link 130. Each of the links 124-130 may represent a single connection through a network, or physically separate connections.

With the addition of the EDrop system 106, access to the market 104 is expanded. The EDrop system 106 includes, for example, an application server 132 (that stores executable applications), an e-mail server 134 (responsible for sending and receiving e-mail), and a message queue (MQ) server 136. The e-mail server 134 is not a required part of the EDrop process. In addition, the EDrop system 106 also includes a risk management server 138 (that executes risk management software), a quote server 140 (that receives real time quotes from an external source), and a gateway 142 (that communicates with the market 104).

Also illustrated as part of the EDrop system 106 is a trader terminal 144, a risk management system 146, and a option order message queue 148. An internal network, illustrated as an Ethernet network 150, connects the servers 132-142, trader terminal 144, and risk management system 146. The external real time quote server 152 provides real time security quotes and other statistics to the quote server 140.

The EDrop system 106 is connected to the OFP 102 through the WAN 154 (although the EDrop system 106, OFP 102, and market 104 may all be connected on a single network). As the OFP 102 generates an option order for the market 104, the OFP 102 contemporaneously generates a copy of the option order and transmits the copy to the EDrop system 106. The EDrop system 106 thereby receives the option order at the same time, or within milliseconds after the market 104.

The option order copies are queued in the order message queue 148. The queue server 136 monitors the queue for new option orders, retrieves the option orders, and presents the option orders on the trader terminal 144. To this end, the queue server 136 (or software running on the trader terminal 144) may identify in the option order option contract elements including underlying security, option quantity, expiry, strike price, and a contract identifier (e.g., an alphanumeric string).

As will be explained in more detail below, the trader operating the trader terminal 144 may then determine a potential cross quantity and a potential cross price based on the option order. Subsequently, the EDrop system 106 submits a contra-order, with respect to the option order, specifying contract elements including the contract identifier, underlying security, strike price, and expiry, as well as the potential cross quantity and the potential cross price, to the market 104 for fulfillment.

Turning briefly to FIG. 2, that figure illustrates an embodiment of a pop-up 200 displayed on the trader terminal 144. The pop-up 200 presents, for the option order, the current market bid 202 and ask 204 at the market 104 (as well as additional markets). The pop-up 200 also provides trader ask 206, trader bid 208, and trader quantity entries 210, a refresh button 212 (for updating the current bid and ask prices), a submit button 214, and a Cancel button. Pressing the submit button provides a submit indicator to the EDrop system 106 that the trader desires to send a contra-order to the market 104.

The EDrop system 106 prepares the contra-order, using the trader bid or ask price, and the trader quantity as specified in the pop-up 200.

Additionally shown in the pop-up 200 are risk management entries 216 Delta, Gamma, Vega, Theta, and Rho for WJNAS (the contract symbol for this example), the trader current position, and the trader new position. The risk management entries represent trading parameters, boundaries or references and provide trading guidelines to the trader. The pop-up includes other information as well, including indicators for An Immediate or Cancel (i.e., an order is filled immediately at said price and quantity at the moment upon presentation or cancelled), Day (i.e., Day Orders are good at said quantity and price for the entirety of the trading day in which it was entered into the market), MKT (i.e., a Market Order to be traded at the quantity specified and the current price available at the market), NH (Price Not Held, i.e., an order at the specified quantity but not held to the specified price, E-size (the quantity of the order received from the OFP 102), Average values for implied volatilities, are captured in FIG. 2 for WJNAS at a moment in time at the values 31.836, 31.25, 32.81, 97.4375, and 97.5.

Returning to FIG. 1, the EDrop system 106 uses the link 156 through the gateway 142 to the EDrop order server 158 in the market 104 to communicate contra-orders, while the link 160 may be used to communicate resultant execution messages back to the EDrop system 106. The results of contra-order processing at the market 104 are also passed through the trademarch module 122 and OCC module 128 for reporting to the OFP 102.

It is also noted that the potential cross quantity, potential cross price, and the decision to submit a contra-order may be automated. In other words, in certain embodiments, the EDrop system 106 makes contra-order decisions automatically for every option order, or a subset of option orders based on, for example, risk management criteria. The remaining option orders may then be presented on the trader terminal 144.

Take for example, an IBM option order specifying a purchase of 50 calls of IBM. The OFP 102 submits the IBM option order to the market 104, but also contemporaneously submits an option order to the EDrop server 106. As the IBM option order makes its way to, and enters the market 104, the EDrop system 106 presents the IBM option order (and additional information as noted above with respect to FIG. 2) on the trader terminal 144. A trader may then determine whether to meet the order in whole or in part (or not at all).

For example, the trader may attempt to meet 15 of the 50 calls. The EDrop system 106, in response, submits a contra-order, with respect to the original order, to the market 104. In other words, the EDrop system 106 sends an option order to sell 15 calls of IBM. At the market 104, the contra-order and the original order may cross, resulting in 15 of the 50 purchase calls of IBM filled by the EDrop system 106 through the supporting infrastructure of the market 104.

Although FIG. 1 illustrates a single OFP 102, market 104, and EDrop system 106, there may be multiple OFPs, markets, and EDrop systems interconnected. Preferably, an EDrop system converts option orders (and other messages) sent from each OFP into an internal standard format for processing. Outgoing messages (including contra-orders) are translated into a format compatible with their destination (e.g., the market 104).

Turning next to FIG. 3, that figure presents a data flow diagram representative of the processing that occurs in the EDrop system 106. The OFP 302 sends option order copies (and possibly additional messages) to the EDrop system 304.

The EDrop server 304 preferably converts the OFP 302 option order copy format into an internal trading system format. The same internal trading system format is preferably used for each OFP that may be connected to the EDrop server 304. For example, the OFP 302 may send an option order copy reciting the feedcode MSQVA. The feedcode is then interpreted according to the standard specified by the OCC (Options Clearing Corporation) as an October 105 put for Microsoft (MSFT). The quantity may be obtained from a subsequent line in the option order copy.

The fields provided in the internal trading system format are illustrated below in Table 1. The field values may be stored in individual variables, or collected into one or more data structures.

TABLE 1

| A. Message Header | B. Trade Destination | C. Transaction Number | D. Trade Status |
|---|---|---|---|
| E. Date of Trade | F. Time of Trade | G. Confirmation time of Order | H. Execution Firm |
| I. Execution Broker | J. Flags | K. Symbol | L. Exchange Code |
| M. Expiration Date | N. Strike Price | O. Price | P. Quantity |
| Q. Open Quantity | R. Minimum Quantity | S. Timed Order | T. Good until code |
| U. Good until | V. Stop limit price | W. Stopped price | X. With discretion fraction |
| Y. Commission rate | Z. Account | AA. Sub account | BB. Clearing firm |
| CC. Routing code | DD. Specialist | EE. Booth ID | FF. User Data |
| GG. User comment | HH. Reserved space | | |

The format of an option order varies from OFP to OFP. For example, the OFP 102 may use the fields shown below in Table 2.

TABLE 2

| 1. Buy/Sell | 2. Call/Put | 3. Quantity | 4. Symbol |
|---|---|---|---|
| 5. Month | 6. Strike | 7. Price Type | 8. Execution Type |
| 9. Firm Order Type | 10. Price | 11. Routing ID | 12. Accounting ID |
| 13. Sequence Number | 14. Exchange | 15. Filler | |

An exemplary conversion of the fields shown in Table 2 to the fields of the internal trading system format shown in Table 1 is:

Field to Field 1 to J
1 to J
3 to P
4 to K
5 to M
6 to N
7 to J or S-X (depending on Price Type)
8 to J
9 to J
10 to V
14 to B and/or CC All other inbound fields may be ignored and stored in a database. Note that the internal trading system format includes many fields that are not necessarily specified in a given OFP option order format. The fields are provided, however, so that the fields in more complex option orders received from other OFPs may be maintained and manipulated in the EDrop system 106.

The EDrop server 304 performs a first filtering operation 306 of the messages. The first filtering operation 306 allows for an immediate cut in the number of orders viewed by client processes. The filters include:

Size (the size of the order being traded),
Order Type (Type of execution or pricing style to be applied to the order at the floor.),
Route (forwarded to client services based on Route specified, i.e., the exchange to which the order is to be traded).

Additional filters include: Underlying Symbol, Industry Sector, Beta values and OFP disseminated criteria. An example implementation of a filter check on size is: If then contract specifies an order size less that the Auto-Ex (exchange automatically executed) size then filter the order (i.e., do not present the order to the client process described below).

Examples of execution types include Combination or Spread orders, GTC (Good till canceled), Day (Day orders), 10C (Immediate or cancel), or AON (All or none). Examples of pricing styles include Market (Market price), Limit (Limit to customer price), and NH (Not held to specified price).

All messages received pass through the text dump process 308 and are stored in the unfiltered database 310. Messages that pass through the first filter process 306 are stored, using an SQL database process 312 into a filtered database 314. Thus, the filtered database 314 preferably maintains messages that are eligible orders, in the sense the orders have passed an initial level of review and may result in a contra-order as explained below.

Continuing with respect to FIG. 3, the messages that pass the first filter process 306 continue through a second filter process 316. As examples, the second filter process 316 may provide client level filtering to reduce the number of orders viewed by the end-user by removing orders that meet a certain set of user-definable criteria.

The criteria may include, as examples:

Marketability (i.e., how valued is the order compared to the pricing available at the market),
Delta Risk (i.e., the directional risk in the order),
Position Risk (i.e., the manner in which the order being viewed will affect the current position at a strike level, month level, and global position management level).

As an example, a filter check for marketability may be implemented by determining the current NBBO (National Best Bid/Offer) and sending only orders that are near or inside these parameters.

Additional filter criteria include: Theta, Vega, and Gamma filters, as well as Volatility Filters, and Corporate Action filters. A customizable set of Price versus Edge filters are available for advanced filtering, in addition to Profit and Loss and Unit filters that refresh based on current position changes. To that end, an API to which additional filters can be added is optionally provided. The API provides function calls to change the filters when the market conditions or position strategies merit those changes.

Messages (typically option orders) that pass through the second filter process 316 are presented to the EDrop Client 318. The EDrop client 318 presents the option order copy information (and additional information shown in FIG. 2, for example), on a trader terminal. Alternatively, the EDrop client 318 may make an automated decision of potential cross quantity and potential cross price, and automatically submit a contra-order to the market 104.

Contra-orders that are sent to the market 104 are preferably stored in an Order Table 322 in a database. After acknowledgement of a partial or full fill, the EDrop client 318 may then store the associated fill information in the Fill Table 324 in the database. A further Trade Table is also provided for stocks, bonds, and other security trades that do not arise from option order placement and acknowledgement.

Figure 4:
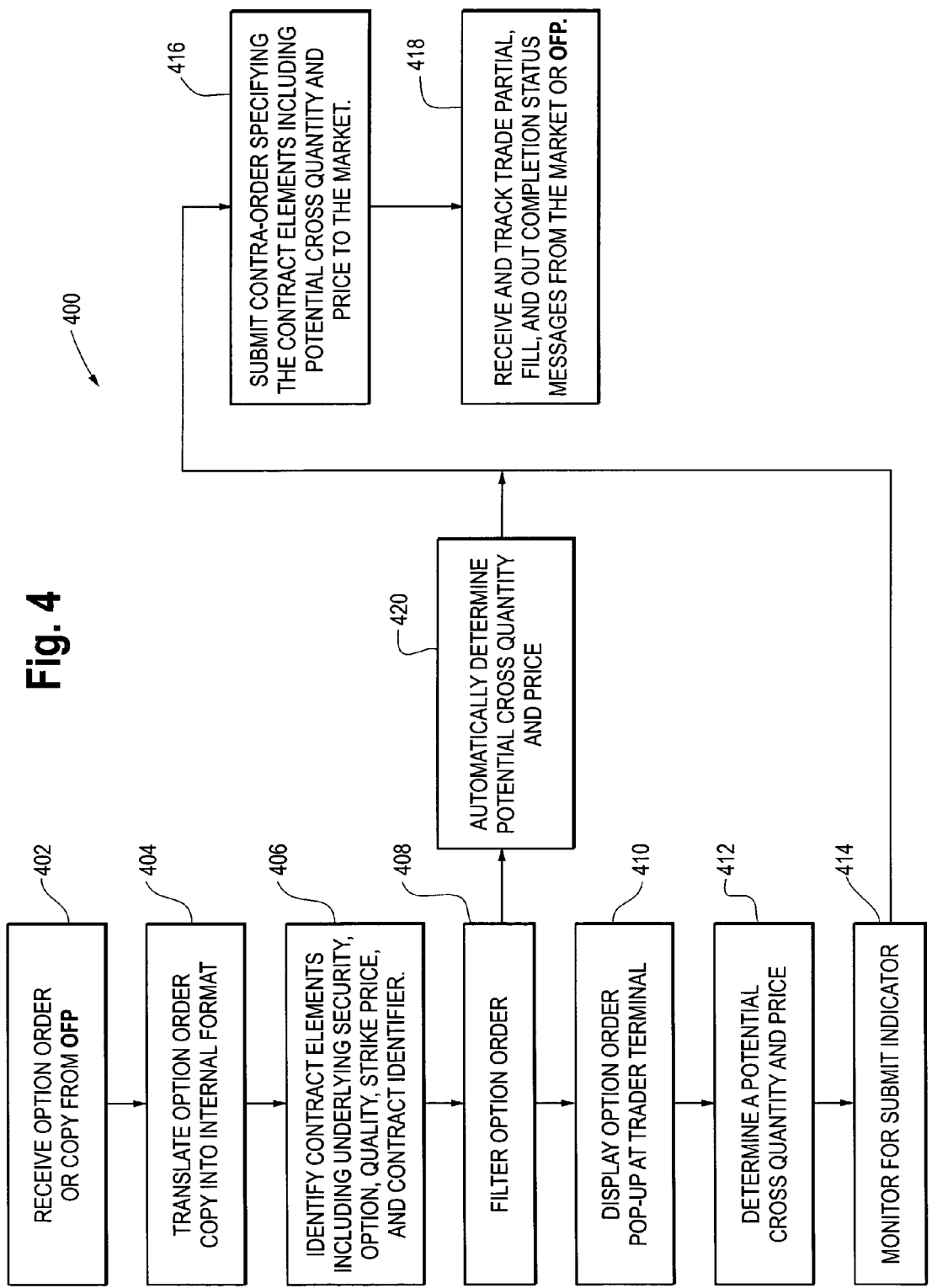
FIG. 4 shows a method for option trading.

With reference next to FIG. 4, that figure shows a flow diagram 400 of a method for option trading implemented in software in the EDrop system 106. The EDrop system receives 402 an option order copy from an OFP, and translating 404 the option order copy into an internal trading system format.

Next, the EDrop system 106 identifies 406 contract elements in the option order copy. The contract elements may include, for example, a contract identifier, underlying security, strike price, option quantity, and expiry. As noted above, the EDrop system 106 may then filter 408 the option order copy and display 410 decision-making information on a trader terminal. The decision making information includes, for example, the contract elements identified above, as well as underlying security bid and ask prices (possible at many different markets), option bid or ask price, risk management variables, and the like.

The trader then determines 412 a potential cross quantity and price, while the EDrop system 106 monitors 414 for a submit indicator (e.g., the click of the Submit button 214). Subsequently, the EDrop system 106 obtains the potential cross quantity and price from the trader terminal, and submits 416 a contra-order, with respect to the original option order, to the market. The contra-order includes, for example, the contract elements including a contract identifier, underlying security, strike price, expiry date, potential cross quantity, and potential cross price. Next, the EDrop system 418 receives order fulfillment messages from the market 104 or OFP 102. The fulfillment messages may include, for example, full fills, partial fills, or outs, and are typically stored in a database at the EDrop system 106 for tracking and reporting purposes.

As noted above, the EDrop system 106 may instead automatically determine 420 a potential cross quantity and potential cross price. To that end, the EDrop system may examine risk management criteria, such as those set forth above. As an example, if the presented order information from the OFP points to an increase in volatility exposure for the trading position, a reduced amount of the order may be acted upon. The EDrop system 106 may then automatically determine a potential cross quantity of a reduced size and a potential cross price of that equal to the NBBO (i.e., the National Best Bid Offer).

While the invention has been described with reference to a preferred embodiment, it will be understood by those skilled in the art that various changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

The invention claimed is:

1. A system for trading stock options, comprising:
an electronic order flow provider for generating an option order having a contract identifier, underlying security, strike price, and expiry;
a market in communication with the electronic order flow provider through a network, the market receiving the option order from the electronic order flow provider; and
an electronic drop (EDrop) system connected to the order flow provider, the EDrop system receiving a copy of the option order at substantially the same time as the market receives the option order from the electronic order flow provider, wherein a potential cross quantity and a potential cross price based on the option order is obtained at the EDrop system, and wherein the EDrop system submits a contra-order based on the option order to the market for fulfillment, the contra-order specifying contract elements including the contract identifier, expiry, underlying security potential cross quantity, and the potential cross price.

2. The system of claim 1, wherein the contra-order is a (i) sell call when the option order is a buy call option order, (ii) a buy call when the option order is a sell call option order, (iii) a sell put when the option order is a buy put option order, and (iv) a buy put when the option order is a sell put option order.

3. The system of claim 1, further comprising at least one trader terminal, wherein the data regarding at least one of the option order and the contra-order is displayed on said trader terminal.

4. A system for trading stock options, comprising:
an electronic order flow provider for generating an option order having a contract identifier, underlying security, strike price, and expiry;
a market in communication with the electronic order flow provider through a network, the market receiving the option order from the electronic order flow provider; and
an electronic drop (EDrop) system connected to the electronic order flow provider, the EDrop system receiving a copy of the option order at substantially the same time as the market receives the option order from the electronic order flow provider, wherein the EDrop system submits a contra-order based on the option order to the market for fulfillment, the contra-order specifying contract elements, at least some of which are based on the option order.

5. The system of claim 4, wherein the contra-order is a (i) sell call when the option order is a buy call option order, (ii) a buy call when the option order is a sell call option order, (iii) a sell put when the option order is a buy put option order, and (iv) a buy put when the option order is a sell put option order.

6. The system of claim 4, further comprising at least one trader terminal, wherein the data regarding at least one of the option order and the contra-order is displayed on said trader terminal.

7. A method of trading in a securities trading network having a market, the method comprising:
- receiving an order at the market;
- contemporaneously receiving information regarding the order at a server;
- automatically identifying contract elements in the order;
- automatically obtaining a contra-order based on the order at the server; and
- submitting the contra-order to the market for fulfillment.

8. The method of claim 7, wherein the server is separate and distinct from the market.

9. The method of claim 7, wherein the order is one of a stock and index option order.

10. The method of claim 7, wherein receiving comprises receiving an order selected from a group of option orders consisting of buy calls, sell calls, buy puts, and sell puts.

11. The method of claim 10, wherein submitting comprises submitting a sell call when the order is a buy call order, and submitting a buy call when the order is a sell call order.

12. The method of claim 10, wherein submitting comprises submitting a sell put when the order is a buy put order, and submitting a buy put when the order is a sell put order.

13. The method of claim 7, wherein receiving comprises receiving the order from an order flow provider that contemporaneously submits the information regarding the order to the server.

14. The method of claim 13, further comprising the step of translating the order from an order flow provider format into an internal trading system format, and wherein submitting comprises submitting the contra-order in a market format.

15. The method of claim 14, wherein receiving further comprises receiving an additional option order from an additional order flow provider, and further comprising translating the additional option order from an additional order flow provider format into the internal trading system format.

16. The method of claim 7, further comprising displaying at least an underlying security, an option quantity, at least one of an option bid price and option ask price, and an ask price at a trader terminal, and monitoring the trader terminal for a submit indicator.

17. The method of claim 16, wherein displaying further comprises displaying underlying security bid and ask prices at the market.

18. The method of claim 17, wherein displaying further comprises displaying risk management variables.

19. The method of claim 7, further comprising applying a filter to the order before determining a potential cross quantity.

20. The method of claim 19, further comprising storing the order in a filtered database when the order passes the filter.

21. The method of claim 7, further comprising storing the order in an unfiltered database.

22. A method of trading a security, the method comprising:
- transmitting information regarding an order from an electronic order flow provider to a first server; and
- automatically submitting a contra-order based on the order to at least one of the first server and a second server within the market for fulfillment, wherein the contra-order specifies at least one of an underlying security potential cross quantity, and the potential cross price.

23. The method of claim 22, wherein the first server is separate and distinct from the market.

24. The method of claim 22, wherein the order is one of a stock and index option order.

25. The method of claim 22, further comprising receiving the order at the market.

26. The method of claim 25, wherein the order is selected from a group of option orders consisting of buy calls, sell calls, buy puts, and sell puts.

27. The method of claim 22, wherein submitting comprises submitting a sell call when the order is a buy call order, and submitting a buy call when the order is a sell call order.

28. The method of claim 22, wherein submitting comprises submitting a sell put when the order is a buy put order, and submitting a buy put when the order is a sell put order.

29. The method of claim 22, further comprising translating the order from an order flow provider format into an internal trading system format, and wherein submitting comprises submitting the contra-order in a market format.

30. The method of claim 22, further comprising displaying at least an underlying security, an option quantity, at least one of an option bid price and option ask price, and an ask price at a trader terminal, and monitoring the trader terminal for a submit indicator.

31. The method of claim 30, wherein displaying further comprises displaying underlying security bid and ask prices at the market.

32. The method of claim 31, wherein displaying further comprises displaying risk management variables.

33. The method of claim 22, further comprising the step of applying a filter to the order before determining the potential cross quantity.

34. The method of claim 33, further comprising storing the order in a filtered database when the option order passes the filter.

35. The method of claim 22, wherein the first server is included within an electronic drop (EDrop) system.

36. The method of claim 22, wherein the information regarding the order is a copy of the order.

37. The method of claim 22, further comprising submitting the order to the second server within the market; and wherein said transmitting comprises contemporaneously transmitting information regarding the order from the order flow provider to the first server during said submitting.

38. The method of claim 22, further comprising obtaining a potential cross quantity and a potential cross price based on the order at the first server before said submitting.

39. The method of claim 38, wherein said obtaining comprises automatically obtaining a potential cross quantity and potential cross price.

40. The method of claim 22, further comprising interconnecting the market to at least one other market.

41. The method of claim 22, wherein the information regarding the option order is the option order.

42. A trading network system, comprising:
- an electronic order flow provider for generating an order having a contract identifier, underlying security, strike price, and expiry;
- a market in communication with the electronic order flow provider through a network, the market configured to receive the order; and
- a server in communication with the electronic order flow provider and the market, the server receiving information regarding the order, wherein a potential cross quantity and a potential cross price based on the order is obtained at the server, and wherein the server submits a contra-order based on the order to the market for fulfillment.

43. The system of claim 42, wherein said server is remote from the market.

44. The system of claim 42, wherein the order is one of a stock and index option order.

45. The system of claim 42, wherein the information regarding the option order is a copy of the option order.

46. The system of claim 42, further comprising at least one other market interconnected with the market.

47. The system of claim 42, wherein the information regarding the option order is the option order.

48. The system of claim 42, wherein the contra-order specifies contract elements including the contract identifier, expiry, underlying security potential cross quantity, and the potential cross price.

* * * * *